United States Patent [19]

Bui et al.

[11] Patent Number: 4,663,624

[45] Date of Patent: May 5, 1987

[54] PAGER HAVING RECEIVING FRAME TUNED BY TRANSDUCER

[75] Inventors: Ngoc C. Bui, Fontaines; Claude-Eric Leuenberger, Chezard, both of Switzerland

[73] Assignee: Asulab, S.A., Bienne, Switzerland

[21] Appl. No.: 714,285

[22] Filed: Mar. 21, 1985

[30] Foreign Application Priority Data

Apr. 25, 1984 [CH] Switzerland ........................ 2030/84

[51] Int. Cl.[4] ................................................ C08B 3/00

[52] U.S. Cl. ............................ 340/825.44; 340/384 E; 368/255

[58] Field of Search ...................... 368/255, 76, 10, 12, 368/47; 310/314, 321; 340/384 E, 311.1, 825.44, 825.47; 455/230, 266, 89

[56] References Cited

U.S. PATENT DOCUMENTS 3,937,004 2/1976 Natori et al. ............... 340/825.44 X
4,362,399 12/1982 Fick .................................... 368/255

FOREIGN PATENT DOCUMENTS 533332 3/1973 Switzerland .
639816 12/1983 Switzerland .

*Primary Examiner*—Ulysses Weldon
*Attorney, Agent, or Firm*—Pollock, Vande Sande & Priddy

[57] ABSTRACT

A pager is described for use in an electronic watch. The pager comprises a frame (1) for picking up a magnetic signal and a piezoelectric transducer (11) having a static capacitance on its terminals, for producing a sound.

To improve sensitivity of reception, a switching circuit (15) connects the transducer (11) in parallel with the frame (1) to tune it by means of the static capacitance to the frequency of the magnetic signal carrier wave. To increase the performance of the transducer (11) when it operates as a sound transmitter, the switching circuit (15) connects the frame (1) in series with the transducer (11).

5 Claims, 5 Drawing Figures

PAGER HAVING RECEIVING FRAME TUNED BY TRANSDUCER

BACKGROUND OF THE INVENTION

1. Field of the Invention

This invention relates to pagers and is more particularly concerned with a miniaturized form of pager that can be fitted into a watch.

2. Prior Art

Pagers have long been known. They comprise a frame or coil constituting an antenna able to detect a coded magnetic field issued by a transmitter a relatively short distance away (a few dozen meters). If the received code corresponds to the code of the pager, stored in a memory, a transducer issues an acoustic signal and possibly an optical signal which warn the bearer of the pager that he must, e.g., dial a telephone number.

These paging devices are shaped like small boxes that can easily fit in a pocket. Besides the frame and the transducer, they comprise a number of electronic circuits and supply batteries.

The scope for a paging device increases when its size can be reduced, when it is able to detect a weak magnetic field, when it can issue a powerful acoustic signal, when its energy consumption is low and when it can be produced for low cost price.

To achieve maximum sensitivity of the frame to a sinusoidal magnetic field, the inductance of the frame is usually tuned to the frequency of the field by means of a capacitor. It is also known to connect an inductor in series with the transducer thereby to tune the latter to the frequency of the acoustic signal and hence to increase the power of the sound that is issued and to improve the efficiency of the transducer, the latter being the main user of energy in such a device.

These improvements are thus achieved by means of two components, a capacitor and an inductor, whose drawback, particularly the latter, is to take up a good deal of space in the device and to add to the cost of the latter. This is particularly bothersome when trying to reduce the size of the pager sufficiently to fit it in an electronic watch.

The idea of associating a pager with a watch is not new in itself. For example, Swiss Patent Specification No. 533332, or the corresponding German Patent Specification No. 2149535, mentions the possibility of including a pager in a watch but without however providing a form of embodiment. U.S. Pat. No. 3,937,004 describes a watch fitted with a pager that operates intermittently to save current. In this U.S. Patent specification, the means for picking up the external electromagnetic wave and the means for generating an acoustic signal are however not described in detail. Reference is merely made to an antenna and to a sound transmitter, but no details are given. Finally, Swiss Patent Specification No. 639816 describes an analogue watch wherein the coil of the motor is used between drive pulses as a detector able to detect interference magnetic fields. These fields may occur at various frequencies, thus making the tuning of the coil pointless.

In none of the above documents relating to the watch-making art is there any reference to a frame tuned by a capacitor and to a piezoelectric transducer tuned by an inductor nor is any reference made to the possibility of eliminating totally or partially the capacitor and the inductor whose drawback, as mentioned earlier, is to be space consuming and to be costly.

SUMMARY OF THE INVENTION

A main object of the invention is to remoe these drawbacks by doing away with the capacitor for tuning the frame and with the inductor for tuning the piezoelectric transducer, without thereby reducing the performance of the pager.

According to the invention there is provided a pager which comprises:

- a receiving frame for picking up a variable magnetic signal and having a pair of terminals;
- a piezoelectric transducer for generating a sound and having a pair of terminals across which it presents a static capacitor, one of these terminals being connected with one of the terminals of the transducer;
- a source having a pair of terminals and able to generate an electric signal of acoustic frequency;
- means for generating a logic control signal in response to the magnetic signal; and
- a switching circuit able to respond to a first state of the logic signal to connect the other terminal of the frame with the other terminal of the transducer, and to a second state of the logic signal to connect one terminal of the source with the other terminal of the frame and the other terminal of the source with the other terminal of the transducer.

BRIEF DESCRIPTION OF THE DRAWINGS

In the accompanying drawings, in which the same reference numerals are used for corresponding elements.

DETAILED DESCRIPTION

A paging system comprises a transmitter and a series of receivers carried by a number of people. The transmitter radiates a magnetic sinusoidal carrier field or wave coded by an amplitude modulation, having a specific carrier frequency and sufficient power to reach the receivers within a given radius. All receivers are tuned to the same carrier frequency, but a particular receiver will only respond to the transmitted wave, e.g. by emitting an acoustic signal, if the code of the wave corresponds to the code of the receiver, stored in a memory. Each receiver responds to a different code. If several groups of receivers are to operate in neighbouring areas, a different carrier frequency is allocated to each group.

Typically frequency $f_0$ of the carrier wave ranges between 28 and 55 kHz, and frequency $f_1$ of the acoustic signal ranges between 1 and 2 kHz.

Figure 1:
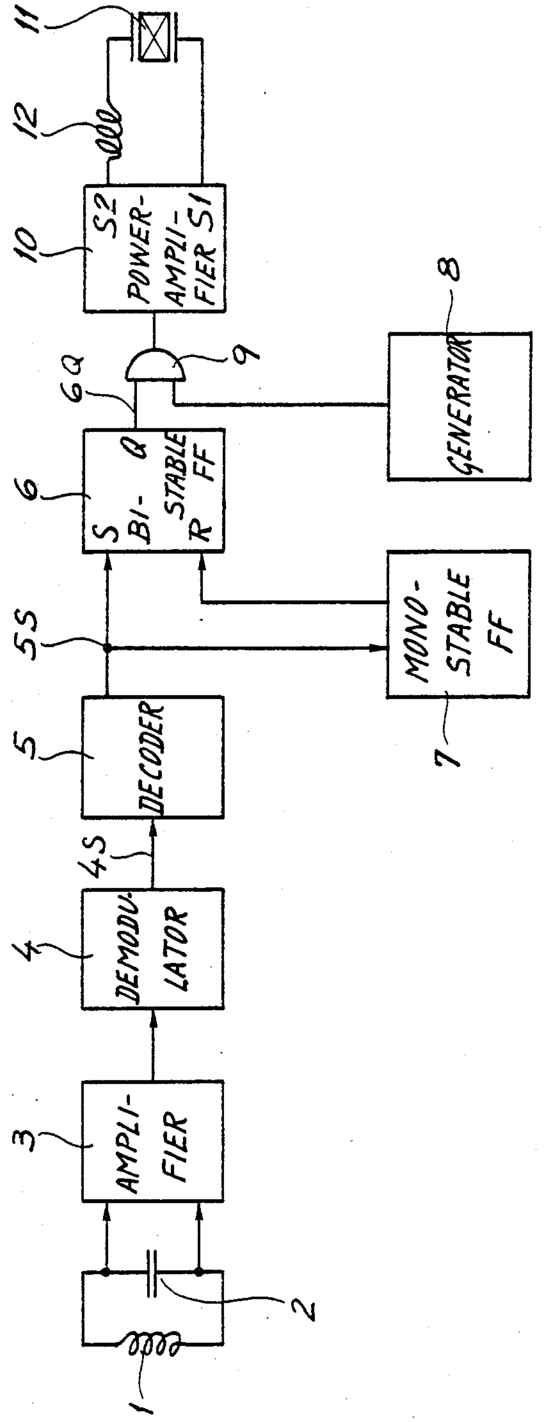
FIG. 1 is an example of a block diagram for a known pager.

The known pager shown in FIG. 1 comprises a frame or coil 1, having an inductance $L_c$, acting as an antenna to pick up the magnetic field. The voltage induced in the frame by the field can be increased, in known manner, by tuning inductance $L_c$ of the frame to carrier frequency $f_0$ by means of a capacitor 2, having a capacitance $C_c$, connected across its terminals. This voltage, then multiplied by the quality factor $Q_c$ of the frame measured at frequency $f_0$, is applied to the input of a very selective high frequency amplifier 3, tuned to the same frequency $f_0$ by means of, e.g., a ceramic or quartz filter. The output of amplifier 3 is connected to the input of a demodulator 4 issuing on its output a signal 4S made up of a series of pulses which correspond to the positive half of the modulated carrier wave envelope. To each arrangement of the pulses of signal 4S there corresponds a particular code.

Signal 4S is applied to the input of a decoding circuit 5. The latter comprises a memory in which the code of the receiver is stored and means for comparing this code with the code transmitted by signal 4S. If the comparison shows that the two codes are identical, signal 5S on the output of decoder 5, normally at a low logic level, goes high for a brief instant. A bistable flip-flop 6 receives signal 5S on its set input S, thus causing the output Q of flip-flop 6 to go high if the output of decoder 5 is high. Signal 5S is also applied to the input of a monostable flip-flop 7 whose output is normally low. This output goes high for a brief instant, $t_{21}$ seconds after each transition of signal 5S from low to high. The signal issued by the output of flip-flop 7 is applied to the reset input R of flip-flop 6 whose output Q thus goes low after each pulse of the signal. Output Q of flip-flop 6, which issues signal 6Q, is linked to one input of a two-input AND gate 9, the other input of the gate being connected to the output of a generator 8 producing a signal of acoustic frequency $f_1$. The output of AND gate 9 is linked to the input of a power amplifier 10 having two output terminals S1 and S2. A circuit comprising an inductor 12 of inductance $L_0$ in series with a piezoelectric transducer 11 is connected across output terminals S1 and S2.

The operation of the FIG. 1 circuit will now be described with reference to the signals shown in FIGS. 2 and 3.

Figure 2:
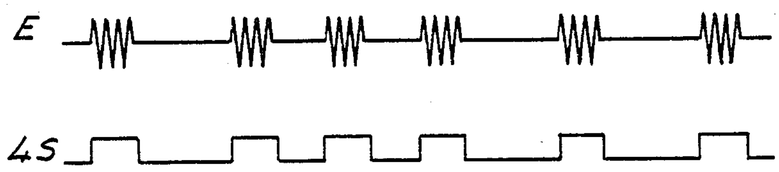
FIG. 2 shows a possible shape of a coded signal received by a pager frame and the logic signal corresponding to the code.

An example of a coded magnetic field issued by the transmitter of the paging system is shown as a function of time by wave E in FIG. 2. It comprises an on-off amplitude modulated carrier wave forming a series of emissions of equal duration, spread over time according to a rule defining the different codes of the coding system.

The magnetic field issued by the transmitter induces in the frame of FIG. 1 a voltage of the same shape as wave E. If frame 1 is tuned by capacitor 2, the voltage obtained is in the region of a few dozen microvolts. After being amplified and demodulated by circuits 3 and 4, the voltage induced in frame 1 takes the shape of signal 4S shown in FIG. 2. The same signal is also shown in FIG. 3 over a longer period. It is made up of series of pulse trains, each train defining the transmitted code. The first pulse train starts at an instant $T_0$ and ends at an instant $T_1$. Similarly, the second pulse train starts at an instant $T_0'$ and ends at an instant $T_1'$. Finally, the third pulse train shown begins and ends at instants $T_0''$ and $T_1''$ respectively. The duration $T_1-T_0$, $T_1'-T_0'$ of each pulse train is constant. The same applies to the duration $T_0'-T_0'$, $T_0''-T_0'$ which separates two consecutive pulse trains. The pulse trains follow one another in this way until the person being pages replies or the transmission ceases after a predetermined time.

Figure 3:
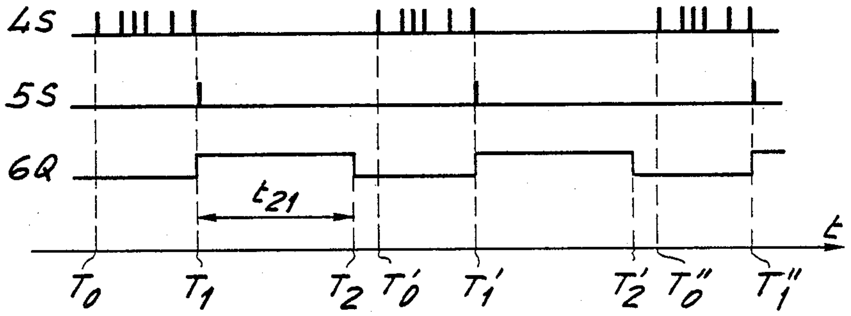
FIG. 3 shows the shape of signals at the principal points of the FIG. 1 diagram.

If the code of the pulse train starting at instant $T_0$ and ending at instant $T_1$ corresponds to that memorized in decoder 5, this circuit issues a short pulse at an instant immediately following instant $T_1$, as shown by signal 5S in FIG. 3. This pulse, applied simultaneously to the inputs of flip-flops 6 and 7 causes output Q of the first to go high, as shown by signal 6Q, and the output of the second to go low. AND gate 9, on receiving signal 6Q on one of its inputs, will allow the signal produced by generator 8, applied to its other input, to reach the input of amplifier 10.

Piezoelectric transducer 11, through being excited by inductor 12 via amplifier 10, then generates an acoustic signal as from instant $T_1$. This signal lasts $t_{21}$ seconds, until an instant $T_2$, i.e. the time needed for the output of flip-flop 7 briefly to go high, long enough to cause output Q of flip-flop 6 to go low again. One input of AND gate 9 being low from instant $T_2$, the signal from acoustic generator 8 is blocked and can no longer excite transducer 11.

The acoustic signal definitely stops at instant $T_2$ if the person being paged does what is required before that instant, e.g. dial a telephone number, to stop the pulse. Otherwise, a second train of pulses, identical to the first, is transmitted as from instant $T_0'$, triggering, at instant $T_1'$, a second acoustic call which lasts until instant $T_2'$.

Figure 4:
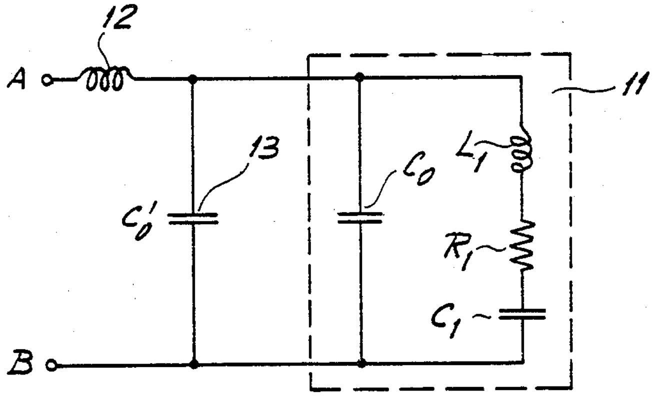
FIG. 4 is the equivalent diagram of a piezoelectric transducer connected in series with a tuning inductor.

The circuit in FIG. 4, having two terminals A and B, is the equivalent diagram of piezoelectric transducer 11 and tuning inductor 12 of inductance $L_0$, connected in series. This diagram comprises a static capacitor $C_0$ whose terminals are connected to a motional branch made up of an inductor $L_1$, a resistor $R_1$ and a capacitor $C_1$. Static capacitor $C_0$ has a capacitance equal to that between the terminals of the transducer, while the vibratory properties of the transducer are represented by parameters $L_1$, $R_1$, $C_1$ of the motional branch.

Motional capacitor $C_1$ is approximately 1000 times weaker than static capacitor $C_0$ whose value can range, depending on the shape of the metallizations between 1 nF and 50 nF in a watch transducer. As for frame 1, built to watch dimensions, it can typically be circular, have a diameter of about 25 mm and contain a thousand turns of a wire approximately 50 micrometers in diameter. The inductance $L_c$ of such a frame then lies between 10 mH and 50 mH.

Capacitor $C_0$ can therefore be quite suitable for tuning inductance $L_c$. On the basis of the extreme values, these two items can have frequencies ranging from 3 kHz to 50 kHz including that used in paging systems. An object of the invention being to eliminate the frame tuning capacitor 2, this object is clearly achieved by using the capacitor $C_0$ of transducer 11 for this purpose.

The operation of transducer 11 as an acoustic transmitter will now be described. As is known the sound that is generated is louder when the current flowing through motional branch $L_1$, $R_1$, $C_1$ of FIG. 4 is large. For this condition to be best achieved, the voltage across the terminals of capacitor $C_0$ must be as high as possible and the frequency of the current should correspond to the resonant frequency $f_1=(2\pi)^{-1}(L_1C_1)^{-\frac{1}{2}}$ of the motional branch. If V is the alternating voltage, of frequency $f_1$, generated by amplifier 10 across terminals A and B of the FIG. 4 circuit, if the motional branch is considered open, and if inductance $L_0$ of inductor 12 is such that $L_0C_0=L_1C_1$, the voltage across the terminals of capacitor $C_0$ would then equal to $Q_0V$, $Q_0$ being the quality factor of inductor 12 at frequency $f_1$. At acoustic frequencies, the value of $Q_0$ can range between 3 and 10.

The voltage across the terminals of capacitor $C_0$, even when loaded by the motional branch whose impedance is high compared to that of $C_0$, will thus remain substantially greater than V.

To avoid a bulky and costly component, in accordance with another object of the invention, inductor 12 can be replaced by frame 1. However if the inductance $L_c$ of frame 1 and the capacitor $C_0$ of transducer 11 are tuned to the frequency $f_0$ of the carrier wave, the efficiency of the frame at acoustic frequency $f_1$, approximately twenty times less than $f_0$, cannot be adquate. Meanwhile the frame affords some improvement compared to a direct drive of transducer 11 by amplifier 10.

To tune inductance $L_c$ to frequency $f_1$, and additional capacitor 13, having a capacitance $C_0'$, can be connected in parallel with $C_0$, as shown in FIG. 4. Tuning is achieved if the value of $C_0'$ satisfies the relationship $(C_0'+C_0)L_c=L_1C_1$. The use of such a capacitor across the terminals of transducer 11 is a complication which is however amply compensated by the possibility of doing away with capacitor 2 and inductor 12 in the diagram of FIG. 1. Additional capacitor 13 can be a second piezo electric transducer having a static capacitance $C_0'$. The two transducers may consist of a single element having two sides with a common terminal on one side and a pair of terminals on the other side, each of the latter two electrodes defining one of the transducers.

The use of frame 1 either as a magnetic wave pick-up or as a tuning inductance for transducer 11 and the use of this transducer either as an acoustic transmitter, or as a tuning capacitor for frame 1, is only possible if a switching circuit is used for suitably connecting the frame and the transducer to fulfil these different functions.

Figure 5:
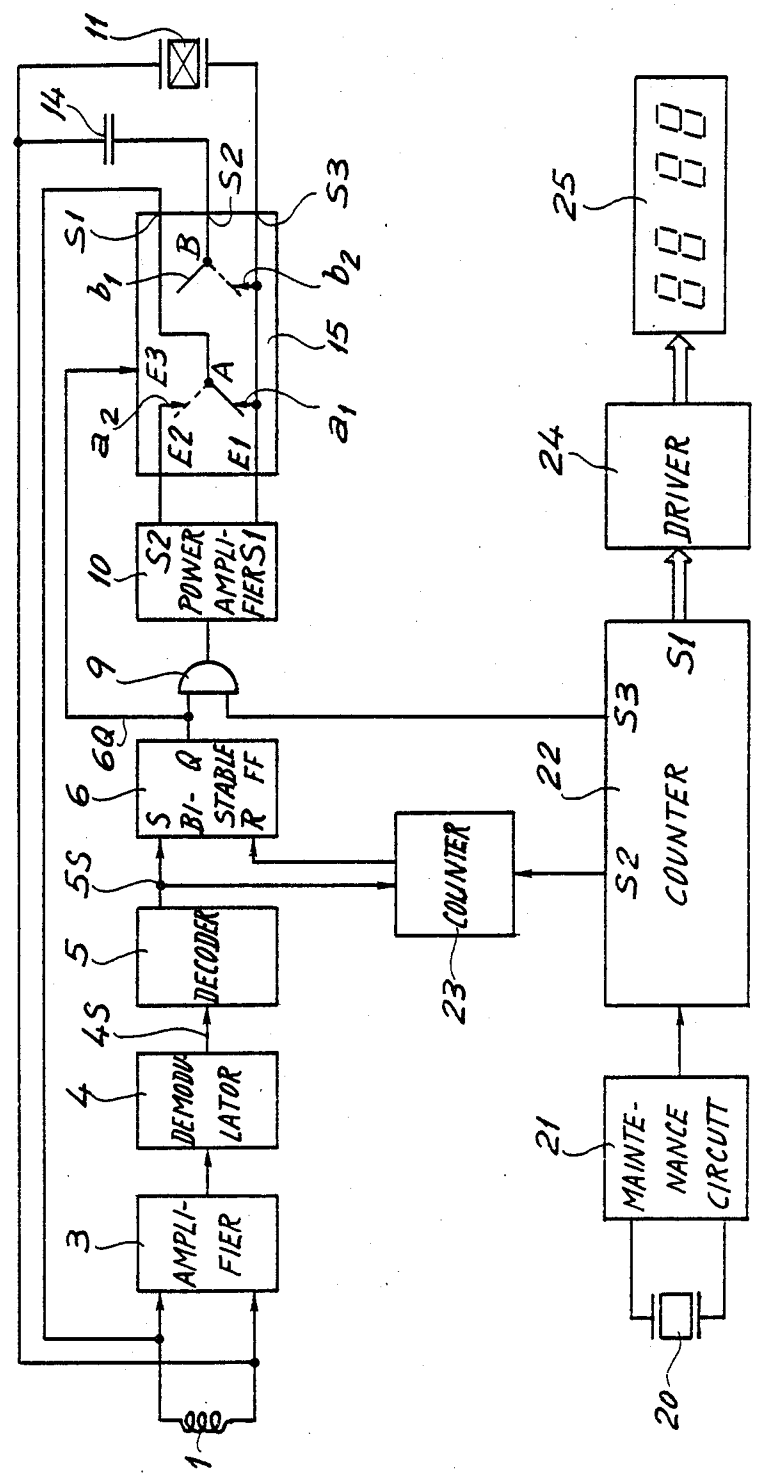
FIG. 5 is a block diagram of a watch, e.g., digital, fitted with a pager according to the invention.

The watch diagrammatically shown in FIG. 5 is of a standard design and comprises a quartz 20 acting as time base, a maintenance circuit 21, a counter 22, a drive circuit 24 and a digital display 25. Quartz 20 and maintenance circuit 21, connected to each other, together form an oscillator. The signal from the output of maintenance circuit 21 is applied to the input of counter 22 which has a main output $S_1$ and two auxiliary outputs $S_2$ and $S_3$. The latter two outputs issue respectively a high frequency signal made up of pulses and a signal of acoustic frequency. Output $S_1$, on the other hand, produces a signal providing the time information. It is applied to the input of drive circuit 24 which generates the signals needed by display 25, to which it is connected, to indicate the time.

The paging part of the FIG. 5 arrangement comprises elements 1, 3, 4, 5, 6, 9 and 10, already described in relation to FIG. 1 and similarly connected in both Figures. Monostable flip-flop 7 in FIG. 1 is replaced in FIG. 5 by a counter 23 of simpler design. Counter 23 receives, on one input, the pulses issued by the output $S_2$ of watch counter 22 and, on another input, signal 5S. Each pulse of signal 5S resets counters 23, then triggers a counting operation. Once full, counter 23 issues a pulse on its output, which is connected to the input R of bistable flip-flop 6. The time needed to fill this counter corresponds to time interval $t_{21}$, previously set by monostable flip-flop 7. The input of AND gate 9 which, in FIG. 1 was linked to the output of acoustic frequency generator 8, is connected in the FIG. 5 circuit to the output $S_3$ of counter 22 which generates a signal having the same frequency.

The switching circuit of frame 1 and of transducer 11 mentioned earlier is represented by block 15 in FIG. 5.

This circuit has three inputs, E1, E2 and E3, and three outputs, S1, S2 and S3. Inputs E1 and E2 are connected respectively to outputs S1 and S2 of amplifier 10. Input E3 receives signal 6Q from the output of bistable flip-flop 6. Output S1 of circuit 15 is connected to one terminal of frame 1. Output S2 of circuit 15 is connected to one terminal of a capacitor 14 which has a capacitance equal to capacitance $C_0'$ of capacitor 13 in FIG. 4. The other terminal of this capacitor is connected to one terminal of transducer 11 and to the second terminal of frame 1. Frame 1, transducer 11 and capacitor 14 thus have a common connection. Finally, output S3, input E1 and the other terminal of the transducer are connected to one another.

Circuit 15 comprises essentially two switches A and B operated by relays not shown. Switch A is connected to output S1 and switch B to output S2. Switch A can take up two positions, $a_1$ and $a_2$. In position $a_1$, switch A closes a contact which links output S1 to input E1. In position $a_2$, output S1 is connected to input E2. Switch B can also take up two positions, $b_1$ and $b_2$. In position $b_1$, switch B closes no contact so that output S2 is inoperative, and in position $b_2$, output S3 is connected to input E1.

The relays not shown actuating switches A and B are controlled by signal 6Q shown in FIG. 3. This signal is applied to input E3 of circuit 15. It will be assumed that when signal 6Q is low, switches A and B are in positions $a_1$ and $b_1$ and that when signal 6Q is high switches A and B are in positions $a_2$ and $b_2$.

The paging part of the FIG. 5 arrangement operates as follows. In the absence of a coded paging signal E, signals 4S, 5S and 6Q in FIGS. 2 and 3 all remain low and switches A and B therefore occupy positions $a_1$ and $b_1$. Both terminals of transducer 11 are then connected to both terminals of frame 1 and one terminal of capacitor 14 is inoperative. In these conditions, the frame is tuned by the static capacitance of the transducer 11 on carrier frequency $f_0$ of signal E, and tuning capacitor 2 in FIG. 1 becomes redundant.

Circuit 15 remains in this state until a coded signal received by frame 1 is recognized by decoder 5. Output Q of flip-flop 6 then goes high at instant $T_1$, causing switches A and B to move respectively to positions $a_2$ and $b_2$. Outputs S1 and S2 of amplifier 10, which acts as an acoustic frequency signal source, are then connected, through switch A, to the terminals of transducer 11 via frame 1, thus making inductor 12 in FIG. 1 useless. Capacitor 14, of $C_0'$ capacitance, is connected directly to the terminals of the transducer through switch B. Consequently, transducer 11 being excited by amplifier 10, generates an acoustic paging signal in the best output conditions. This paging signal is transmitted for $t_{21}$ seconds. Then, at instant $T_2$, with output Q of flip-flop 6 going low, transducer 11 is once more connected to the terminals of frame 1, as at the start of the cycle. If there has been no response to the paging signal, a new cycle, identical to the previous one, is triggered at instant $T_0'$.

The invention is not limited to the pager illustrated and described above, but extends to all equivalent forms of circuits therefor. For example, to facilitate the understanding of circuit 15 in FIG. 5, reference was made to contacts. These contacts can of course be replaced in known manner by electronic switching devices such as transistors and transmission gates.

We claim:

1. A pager comprising:

(a) a receiving frame for picking up a variable magnetic signal, said frame having an inductance and a pair of terminals;

(b) A piezoelectric transducer able to produce a sound, said transducer having a pair of terminals between which exists a static capacitance, and one terminal of said transducer being connected with one terminal of said frame;

(c) a source able to generate an electric signal of acoustic frequency, said source having a pair of terminals;

(d) means connected to said frame for generating a logic control signal in response to said magnetic signal; and, (e) a switching circuit responsive to a first state of said logic signal to connect the other terminal of said frame with the other terminal of said transducer, and responsive to a second state of said logic signal to connect one terminal of said souce with the other terminal of said frame and the other terminal of said source with the other terminal of said transducer.

2. A pager as in claim 1, wherein the inductance of said frame is tuned by the static capacitance of said transducer to the frequency of said magnetic field.

3. A pager as in claim 1 or 2, further comprising a capacitor connected to the terminals of said transducer via said switching circuit when said logic control signal is in said second state.

4. A pager as in claim 3, wherein the inductance of said frame is tuned to said acoustic frequency by said static capacitance increased by the capacitance of said capacitor.

5. A pager comprising:

(a) a receiving frame for picking up a variable magnetic signal, said frame having an inductance;

(b) a piezoelectric transducer able to produce a sound, said transducer having a static capacitance;

(c) a source able to generate an electric signal of acoustic frequency, said source having a pair of terminals;

(d) means connected to said frame for generating a logic control signal in response to said magnetic signal; and, (e) a switching means responsive to a first state of said logic signal for causing said frame and said transducer to be connected in parallel, and responsive to a second state of said logic signal for causing said frame and said transducer to be connected in series between the terminals of said source.

* * * * *